United States Patent [19]

Egli et al.

[11] Patent Number: 4,795,259

[45] Date of Patent: Jan. 3, 1989

[54] PATH LENGTH CONTROL MECHANIZATION FOR A RING LASER ANGULAR RATE SENSOR

[75] Inventors: Werner H. Egli, Minneapolis; Mark W. Weber, Elk River, both of Minn.

[73] Assignee: Honeywell Inc., Minneapolis, Minn.

[21] Appl. No.: 925,762

[22] Filed: Oct. 31, 1986

[51] Int. Cl.⁴ .............................................. G01C 19/64
[52] U.S. Cl. ................................................... 356/350
[58] Field of Search ......................................... 356/350

[56] References Cited

U.S. PATENT DOCUMENTS

| | | | |
|---|---|---|---|
| 3,469,922 | 9/1969 | Coccoli et al. | 356/350 |
| 3,581,227 | 5/1971 | Podgorski | 356/350 |
| 4,152,071 | 5/1979 | Podgorski | 356/350 |
| 4,267,478 | 5/1981 | Ljung et al. | 356/350 |
| 4,320,974 | 3/1983 | Ljung | 356/350 |
| 4,383,763 | 5/1983 | Hutchings et al. | 356/350 |
| 4,597,667 | 7/1986 | Curby et al. | 356/350 |

FOREIGN PATENT DOCUMENTS 2062950 11/1979 United Kingdom ................ 356/350

Primary Examiner—Vincent P. McGraw
Assistant Examiner—S. A. Turner
Attorney, Agent, or Firm—Robert A. Pajak

[57] ABSTRACT

A path length control for a ring laser is described which captures a true peak power laser mode in the presence of parasitic secondary power modes. The control utilizes a decaying dither of the optical path length which decays from a large initial dither amplitude.

13 Claims, 1 Drawing Sheet

PATH LENGTH CONTROL MECHANIZATION FOR A RING LASER ANGULAR RATE SENSOR

The present invention relates to ring laser angular rate sensors, sometimes referred to as ring laser gyros, and more specifically to the mechanization of a path length control for such sensors.

BACKGROUND OF THE INVENTION

Ring laser angular rate sensors, sometimes referred to as ring laser gyros, are well known in the art. A detailed description may be found in the "Background of the Invention" of U.S. Pat. No. 4,597,667, which is incorporated herein by reference.

Briefly, such sensors include a ring laser supported in a block having a plurality of gas containing tunnels. At the intersection of the tunnels are mirrors to define a closed-loop optical path which is traveled by counter-propagating laser beams therein. Practical embodiments of ring laser angular rate sensors usually include a path length controller. The purpose of the path length controller is to maintain a constant path length. Maintaining a constant path length avoids false rotation errors in the usual sensor output. The path length controller function is usually provided by on of the mirrors being attached to a piezoelectric transducer which controls translational movement of the mirror to effect the laser beam path length.

One technique for maintaining a constant path length is detecting the intensity of one or both of the laser beams and controlling the path length of the ring laser such that the intensity of one or both of the beams is at a maximum. U.S. Pat. No. 4,152,071 which issued May 1, 1979 to T. J. Podgorski, and assigned to the assignee of the present invention illustrates a control mechanism and circuitry as just described. Path length transducers for controlling the path length of the ring laser are well known, and particularly described in U.S. Pat. No. 3,581,227, which issued May 25, 1971 to T. J. Podgorski, also assigned to the assignee of the present invention, U.S. Pat. No. 4,383,763, which issued May 17, 1983 to Hutchings et al and U.S. Pat. No. 4,267,478, which issued May 12, 1981 to Bo H. G. Ljung, et al. All these patents are incorporated herein by reference.

In the aforementioned patents, the beam intensity is either detected directly as illustrated in the aforementioned patents, or may be derived from what is referred to as the double beam signal such as that illustrated in U.S. Pat. No. 4,320,974 which issued on March 23, 1982 to Bo H. G. Ljung, and is also incorporated herein by reference.

In path length control systems of the prior art, the path length control finds mirror positioning for which the lasing polygon path length, i.e., the ring laser path length, is an integral number of wavelengths of the desired mode or frequency (spectral line) of the lasing gas. With proper design, the path length control forces the path length traversed by the laser beams to be a value which causes the laser beams to be at maximum power. The properly designed ring laser has a maximum power at transverse modes commonly referred to as an "axial" on "on-axis" modes. There are many longitudinal on-axis modes of operation which satisfy the intended operating condition. Unfortunately, there are other subsidiary parasitic or secondary maximums between different on-axis modes.. These parasitic maximums are sometimes referred to as "off-axis" modes. The corresponding laser power at off-axis modes is less than when the laser is operating at the on-axis modes.

Path length control systems of the prior art are intended to operate at the maximum power or on-axis mode so that laser sensor performance is optimum. Operation of the laser sensor at off-axis modes can lead to an introduction of sensor rotation and performance errors. Unfortunately, prior art path length control systems are unable to distinguish, by themselves, between the absolute maximums and the parasitic maximums corresponding to the on-axis and the off-axis modes, respectively, of laser operation. In order to achieve true maximum power and mode control in prior art systems, additional circuitry must be provided to monitor the beam intensity to force the path length control to operate at the on-axis modes.

BRIEF DESCRIPTION OF THE INVENTION

It is an object of the present invention to provide a path length control system for a ring laser angular rate sensor which can automatically operate about the true maximum power mode.

In the present invention, the ring laser path length is variably dithered between a minimum and a maximum path length in which the difference between the maximum and minimum path length gradually changes from a first difference value which spans at least one mode (one wavelength) to a much smaller, steady state, second difference value. While the path length is dithering and decreasing in path length difference, the primary closed-loop path length control controls the average path length to be at a value at which occurs the maximum power laser beam intensity.

DETAILED DESCRIPTION OF THE INVENTION

Figure 1:
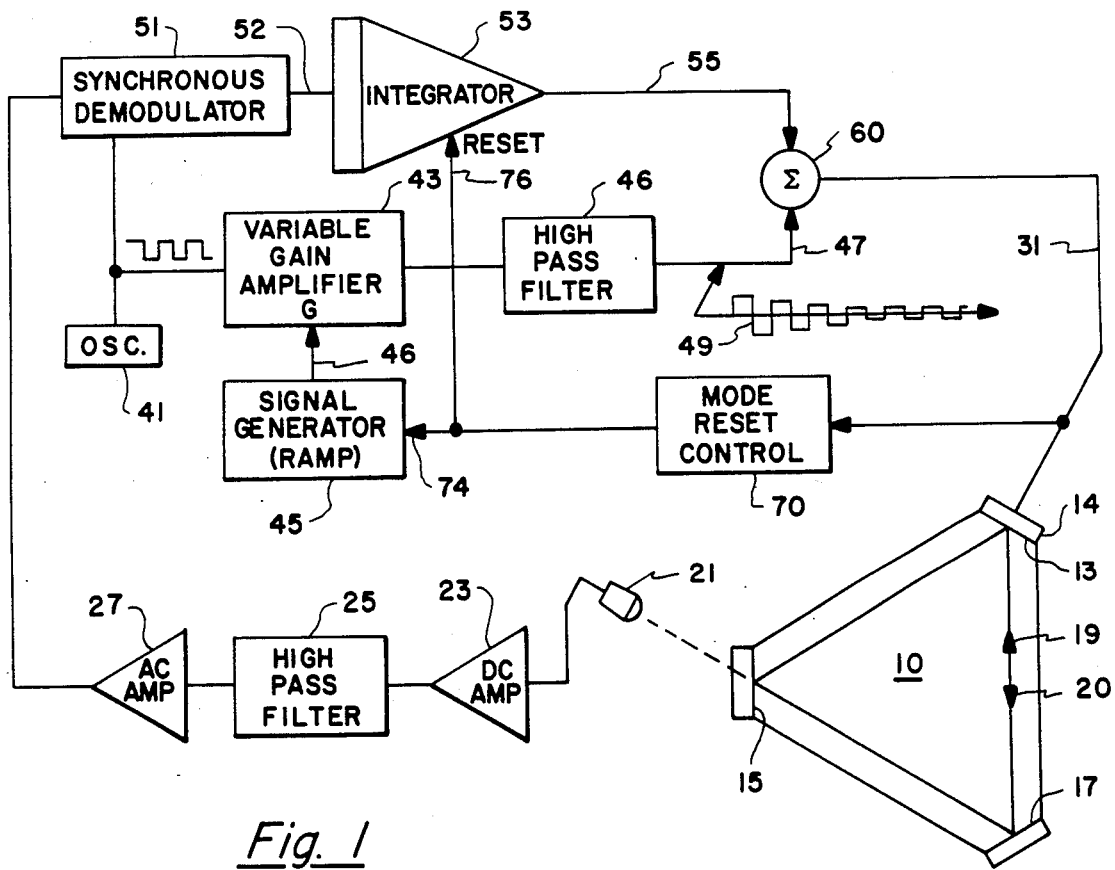
FIG. 1 is a schematic block diagram of a laser angular rate sensor and path length control in accordance with the present invention.

FIG. 1 shows a triangular laser angular rate sensor, well known in the art, generally depicted by reference numeral 10 and a path length control system in accordance with the present invention. Briefly, the laser angular rate sensor 10 is comprised of a laser block 11 and mirrors 13, 15 and 17. Mirrors 13, 15 and 17 define the optical closed-loop path travel by the laser beams as is well known. Mirror 13 is illustrated as part of a path length control transducer 14 for controlling the total optical path length traveled by counter-propagating laser beams 19 and 20.

It should be recognized by those skilled in the art that the present invention is applicable to any closed-loop polygon path in addition to the triangular shaped path shown in FIG. 1. The number of mirrors employed by the sensor is dependent on the shape or configuration selected. .Nevertheless, one of the mirrors will generally be coupled to a path length control transducer, like mirror 13, to perform the same intended function.

Mirror 15 is shown to be partially transmissive for passing a portion of laser beam 20 therethrough to impinge upon a photodetector 21. Mirror 17 may also be transmissive to provide, in part, a readout of the sensor in a well known manner. It should also be recognized by those skilled in the art that mirror 15 may also be part of an optical readout instead of mirror 17.

Figure 2:
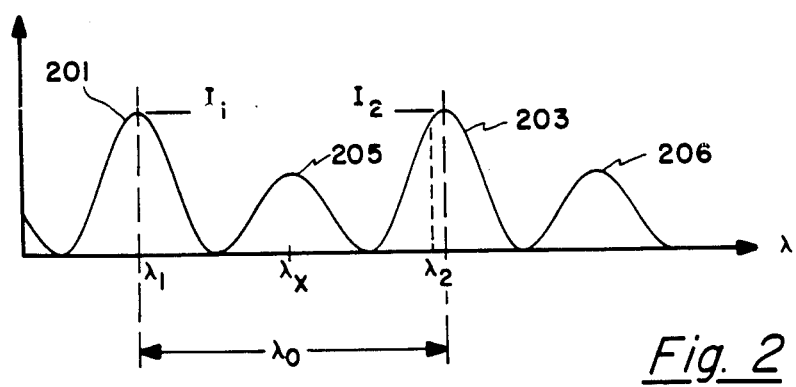
FIG. 2 is a graphical representation of laser beam intensity versus closed-loop laser path length.

FIG. 2 illustrates a typical laser beam intensity profile versus total optical path length of a ring laser, such as ring laser sensor 10 of FIG. 1. Of particular interest are the two major intensity peaks 201 and 203, having values $I_1$ and $I_2$, respectively, which occur at two different values of optical path length separated by a value equal to one wavelength of the laser beam. For a typical helium neon laser, the beam wavelength $\lambda_o$ is approximately 6 microns. As illustrated in FIG. 2, over a change in path length $\lambda_0$, there also exists a minor maximum intensity peak 205. For optimum ring laser angular rate sensor stability and performance, it is paramount that the beam intensity should be maintained at or about either of peaks 201 or 203, or other such major intensity maximums. It is important not to operate about the minor maximum like that of 205 or 206, since operation at such maximum may lend to sensor rotation errors.

As discussed earlier, prior art ring laser angular rate sensors make use of a path length control apparatus for maintaining the beam intensity of one or other of the counter-propagating laser beams, for example 19 and 20 in FIG. 1, at a maximum intensity such as intensity values $I_1$ or $I_2$.

Path length control circuitry of the prior art, and particularly that illustrated in U.S. Pat. No. 4,152,071, operates to maintain the position of mirror 13, such that the average intensity is at a major maximum. Briefly, this accomplished by dithering mirror 13, through transducer 14, by a fixed amplitude oscillating signal. In turn, the laser beam intensity of each of the counter-propagating laser beams will vary in intensity values. Detection circuitry is provided to obtain a signal representative of the intensity variations of one or both of the laser beams which can be further signal processed by way of a closed-loop control circuit. The closed-loop control circuitry is intended to demodulate, at the dither frequency, the output of beam intensity detection circuitry to provide a DC steady state signal to control the average position of mirror 13 at a condition in which the intensity of at least one of the laser beams is at a maximum.

In prior art mechanizations of path length controls, it is possible for the closed-loop control circuit to control about a minor maximum, for example 205. As discussed earlier, prior art path length controls require monitoring the the beam intensity to force the closed-loop control circuit to operate and control about either of the maximums $I_1$ or $I_2$. The additional circuitry functions to force the beam intensity values to be above a predetermined minimum so that the closed-loop control circuit operates about either of the intensity maximums $I_1$ or $I_2$. The path length control circuit, in accordance with the present invention, obviates the need for any additional circuitry and automatically causes the closed-loop control circuitry to operate about either of the intensity maximums $I_1$, $I_2$ or the like, as will be described.

Referring again to FIG. 1, thereshown is beam intensity detection circuitry including photodetector 21, DC amplifier 23, high pass filter 25, and AC amplifier 27. This configuration being only exemplary. The output of photodetector 21 is a signal representative of the intensity of laser beam 20. The output of the photodetector 21 is amplified by DC amplifier 23 and presented to AC amplifier 27 through high pass filter 25. The output of AC amplifier 27 is an output signal representative of the laser beam intensity which is a function of the total closed-loop path length traveled by laser beam 20. The output of AC amplifier 27 is then presented to closed-loop control circuit comprising synchronous demodulator 51 which demodulates the incoming signal at the frequency of oscillator 41. The demodulator output signal 52 is presented to integrator 53. The output of integrator 53 provides an output signal 55 which serves as a signal for controlling the average position of mirror 13 as will be subsequently described.

In order to provide a discriminant signal which can be operated on by the closed-loop control circuit, the position of mirror 13 is continuously dithered in a manner that is determined by the dither circuitry including oscillator 41, variable gain amplifier 43, signal generator 45, and high pass filter 46.

In the present invention, the position of mirror 13 is controlled by command signal 31 which is presented to the input of transducer 14. Command signal 31 is shown as the sum of two signal components 47 and 55. Signal component 55, the output of integrator 53, provides a component signal 31 through summing circuit 60 for controlling the average position of mirror 13. The second signal component 47 of signal 31 the position of mirror 13 to dither in a novel manner as will be described.

In the preferred embodiment, signal generator 45 provides an output signal 46 having an amplitude which gradually decays in amplitude value. This signal is presented as the gain input of variable gain amplifier 43. The characteristics of signal generator 45 will be further described.

Oscillator 41, in the preferred embodiment, provides a square wave output signal which is amplified by variable gain amplifier 43 in accordance with the output signal 46 from signal generator 45. Thus, the output of variable gain amplifier 43 is a square wave signal having amplitude directly related to the output of signal generator 45, the gain control input signal. The output of variable gain amplifier 43 is passed through a high pass filter so as to eliminate any DC component therein.

Signal generator 45, in the preferred embodiment, is a decaying ramp-like signal having its maximum amplitude at initial start up of sensor 10 and having its amplitude decay or ramp downward in until a selected steady state value is reached. Signal waveform 49 in FIG. 1 is representative of signal component 47. Signal waveform 49 is illustrated as a square wave having a fixed frequency and having plus and minus values of amplitude about a zero average value.

Consider the operation of the path length control apparatus of the present invention when the output of integrator 53 is disconnected from summing circuit 60. At the beginning of the initialization of the ramp signal from signal generator 45, the dither circuitry will produce signal 47 to cause mirror 13 to move between first and second positions which define a maximum and minimum closed-loop path lengths which must be traveled by the counter-propagating laser beams 19 and 20 during one dither cycle. The optical closed-loop path length difference between the maximum and minimum path lengths is a function of the peak amplitude of the square wave signal 47. The peak to peak amplitude of signal 47 is directly related to the peak to peak amplitude signal of oscillator 41 multiplied by the gain of variable gain amplifier 43, controlled by the magnitude of the output signal 46 of signal generator 45. Because of the ramp output signal of signal generator 45, the difference between the maximum and minimum path lengths, directed by signal 47, gradually changes from the first difference value, at start-up, to a smaller second difference value, a steady state difference.

The output of AC amplifier 27 represents the intensity signal of laser beam 20 as a function of the position of mirror 13 as controlled by transducer 14, as aforesaid. Generally, the output of AC amplifier 27 will be an AC signal which will have a peak to peak amplitude related to the intensity variations of beam 20 caused by the change in positions of mirror 13 controlled by the magnitude of the dither signal 47.

Because of the change in path length due to dithering, the intensity of beam 20 will vary between first and second intensity values corresponding to the path length changes caused by the variations in the position of mirror 13, as aforesaid. These intensity variations will be detected by photodetector 21 which responds to the beam intensity of beam 20. The output of AC amplifier 27 will therefor be an AC signal having an amplitude which has a peak to peak variation directly related to the intensity variations of beam 20 caused by the varying optical path length resulting from the varying position of mirror 13.

The purpose of the closed-loop circuitry, including synchronous demodulator 51 and integrator 53, is to signal process the variations in the output of AC amplifier 27 and direct the average position of mirror 13 so that the peak to peak variations of the beam intensity are a minimum. Synchronous demodulator 51 provides essentially a DC signal related to the component of the output of the AC amplifier 27 in phase with the signal from oscillator 41. In turn, the output is integrated by integrator 53. The output of integrator 53, namely signal 55, provides a DC signal to transducer 14 for controlling the average path length traveled by beam 20. In other words, the average path length corresponds to the average position of mirror 13.

The combination of the detection circuitry and the closed-loop circuitry provides a closed-loop control system for generating a DC signal component of signal 31 to cause the peak to peak intensity variation of beam 20 to be a minimum. A minimum peak to peak variation signifies a peak power condition of laser beam 20.

In the present invention, the dithering circuitry is such to cause the closed-loop circuitry to find a major maximum of the intensity profile of one of the laser beams. In prior art mechanizations of path length control, the dithering of mirror 13 is generally a very small amplitude, for example, that amplitude which results in a path length dither of $\lambda_0/20$ and is a steady state value. In the present invention, the position of mirror 13 is initially dithered by a value at least as great as that which produces a path length modulation of one full wavelength $\lambda_0$, and gradually reduces to a much smaller steady state value to provide optimum control, for example $\lambda_0/20$. In the practice of the present invention, and particularly the dithering mechanization as just described, the closed-loop circuitry will automatically operate about a major maximum intensity value.

Referring to FIGS. 1 and 2, consider the situation in which the peak to peak amplitude of signal 47 is such to cause the position of mirror 13 to vary the total optical path length traveled by laser beam 20 by one wavelength, $\lambda_0$. In these circumstances, the dithering caused by signal 47 will always capture at least one global maximum over a single wavelength. (It is within the scope of the present invention to provide a dithering signal 47 to capture several maximums, i.e., cause the mirror position of mirror 13 to vary by several wavelengths, $\lambda_0$.) The combination of synchronous demodulator and integrator 53 provides a signal 55 which will move the average position of mirror 13 in a direction toward the path length at which occurs a major intensity maximum.

For example, consider the situation where dithering signal 47 causes the optical path length to initially vary between the minimum total closed-loop path length value $\lambda_1$ having intensity $I_1$, and the maximum path length value $\lambda_2$ having intensity value $I_2$ less than $I_1$. In this situation, the average path length of path lengths $\lambda_2$ and $\lambda_1$ is $\lambda_x$. The closed-loop control circuit will cause the average path length (average position of mirror 13) to move to the left toward $\lambda_1$ until the intensity values at the new maximum $\lambda_2$ and minimum $\lambda_1$ path length dither extremes are equal (minimum intensity difference).

At the same time that the average path length position is being changed in the manner described above, the difference between the maximum and minimum dithered path lengths is gradually decreasing between the initial value toward a much smaller value. As this occurs, the average path length will move toward the left toward $\lambda_1$. Ultimately, the minimum path length caused by dithering will always remain on the peak intensity curve 201 until the dithered maximum path length is also on peak intensity curve 201 with the average path length being at the peak intensity of intensity curve 201. In this manner, the behavior of the circuitry of the present invention illustrated in FIG. 1 results in capturing the maximum peak intensity curve 201 and not the lower or parisitic peak intensity curve 205. Thus, the circuitry of the present invention avoids any need for circuitry to monitor the intensity of the beams to distinguish between on-axis and off-axis mode operation.

It should be recognized by those skilled in the art, that if the initial values of $\lambda_1$ and $\lambda_2$ were at identical absolute intensity maximums of curves 201 and 203, any noise would upset the equilibrium. This would immediately cause the closed-loop control circuit to drive the average position of mirror 13 toward $\lambda_1$ or $\lambda_2$, whichever corresponds to the one position having the greatest intensity. The control loop would then drive mirror 13 to be positioned at the maximum.

It is desirable to make the steady state dithering of mirror 13 to be as small as possible. A steady state dithering of mirror 13 which causes the path length difference to vary 1/20 $\lambda_0$ is a workable steady state dithering in order to achieve good performance.

Further illustrated in FIG. 1 is a mode reset control 70 which monitors the drive signal on signal line 312. Temperature variations can cause the drive signal presented to transducer 14 to exceed the operating limits of mirror movement in response to the drive signal. Accordingly, the mode reset control sends a reset signal on signal line 72 to the reset input 74 of signal generator 45 and to the reset input 76 of integrator 53. In operation, when the signal on signal line 312 exceeds either predetermined upper or lower limits, the signal generator is reset to its initial start up condition to cause the dithering to be greater than one mode wavelength, and at the same time resets the integrator. This will cause the drive signal to be within the operating limits of the transducer, and at the same time cause the path length control to once again zoom in on an on-axis mode o maximum condition of the laser.

While the invention has been described with reference to a preferred embodiment, it will be understood by those skilled in the art that various changes may be made and equivalents may be substituted for elements thereof without departing from the true spirit and scope of the invention. In addition, many modifications can be made to adapt to a particular situation or material without departing from its essential teachings. Specifically, there are many implementations for obtaining the closed-loop circuitry comprising synchronous demodulator 51 and integrator 53. It is well known that a synchronous demodulator 51 may be provided by analog or digital techniques, and specifically an analog multiplier may provide the intended function.

The circuitry of FIG. 1 has been shown to include the use of a signal generator 45 which provides a ramp signal and variable gain amplifier. All that is required, however, is a circuit combination which yields a dithering signal 47 which gradually changes from a first initial value to a second steady state value. The initial value of signal 47 must be sufficient to cause mirror 13 to vary by at least one mode or value of the wavelength of the laser beams. The steady state value must be sufficiently small yet provide dithering to achieve good closed-loop control by synchronous demodulator 51 and integrator 53, or the like. An alternate example of a signal generator 45 is a combination of a one-shot circuit having its output passed through a low pass filter, and the output of the low pass filter being presented as the gain input to the variable gain amplifier 43. As stated earlier, there are many possible combinations to provide the gradually changing dithering of the closed-loop path length.

The embodiments of the invention in which an exclusive property or right is claimed are defined as follows:

1. A ring laser angular rate sensor comprising:
   ring laser means for generating a pair of
   counter-propagating laser beams about a closed-loop path;
   dithering means for variably dithering the length of said closed-loop path between a minimum and maximum path length in which the difference between the maximum and the minimum path length gradually changes from a first difference value to a smaller second difference value; and
   path length control means for controlling the average of said minimum and maximum path lengths to be a value in which a selected function of the intensity of at least one of said laser beams is at a maximum, said path length control means being responsive to the variation in value of said function resulting from said dithering.

2. The sensor of claim 1 wherein said first path length difference value is at least equivalent to one wavelength of either one of said pair of counter-propagating laser beams.

3. A path length control for a ring laser angular rate sensor in which a pair of counter-propagating laser beams travel about a closed-loop path, the path length control apparatus comprising:
   path length transducer means responsive to a first control signal for controlling the path length of said closed-loop path;
   first means for generating a first signal component of said first control signal to cause said path length to variably dither between a minimum and maximum path length in which the difference between the maximum and the minimum path length gradually changes from a first difference value to a smaller second difference value; and
   second means, responsive to the intensity of at least one of said laser beams, for generating a second signal component of said first control signal to cause the average of said maximum and minimum path lengths to be a value at which a selected function of the intensity of at least one of said laser beams is at its maximum function value.

4. The sensor of claim 3 wherein said first path length difference value is at least equivalent to one wavelength of either one of said pair of counter-propagating laser beams.

5. The sensor of claim 3 wherein said first signal component varies between first and second amplitude extreme values which have a difference which decays from a first value to a second smaller value.

6. The sensor of claim 5 further comprising:
   third means, responsive to at least one of said laser beams, for generating a first output signal representative of a selected function of the intensity of at least one of said laser beams;
   said first means having,
   means for generating an oscillating signal having first and second amplitudes;
   signal generating means for generating a gradually changing amplitude signal; and
   variable gain amplifying means having a gain control input for receiving said gradually changing signal, and a signal input for receiving said oscillating signal, said variable gain amplifying means capable of amplifying said oscillating signal in accordance with said gain control input signal and providing said first signal component; and
   said second means includes means for synchronously demodulating said first output signal as a function of said oscillating signal and providing said second signal component .

7. The sensor of claim 6 wherein said first path length difference value is at least equivalent to one wavelength of either one of said pair of counter-propagating laser beams.

8. A ring laser angular rate sensor comprising:
   ring laser means for generating a pair of counter-propagating laser beams about a closed-loop path;
   dithering means for variably dithering the length of said closed-loop path between a minimum and maximum path length in which the difference between the maximum and minimum path length gradually changes form a first difference value to a smaller second difference value; and
   path length control means for controlling the average of said minimum and maximum path length to be a value in which the power of at least one of said laser beams is at a maximum, said path length control means being responsive to the variation in value of a selected function of the intensity of at least one of said beams resulting from said dithering.

9. The sensor of claim 8 wherein said first path length difference value is at least equivalent to one wavelength of either one of said pair of counter-propagating laser beams.

10. A laser power control for a ring laser angular rate sensor in which a pair of counter-propagating laser beams travel about a closed-loop path, the path length control apparatus comprising:

path length transducer means responsive to a first control signal for controlling the path length of said closed-loop path;

first means for generating a first signal component of said first control signal to cause said path length to variably dither between a minimum and maximum path length in which the difference between the maximum and the minimum path length gradually changes from a first difference value to a smaller second difference value; and second means, responsive to the intensity of at least one of said laser beams, for generating a second signal component of said first control signal to cause the average of said maximum and minimum path lengths to be a value at which the laser power of of at least one of said laser beams is at its maximum.

11. The sensor of claim 10 wherein said first path length difference value is at least equivalent to one wavelength of either one of said pair of counter-propagating laser beams.

12. The sensor of claim 10 wherein said first signal component varies between first and second amplitude extreme values which have a difference which decays from a first value to a second smaller value.

13. The sensor of claim 10 further comprising:

third means, responsive to at least one of said laser beams, for generating a first output signal representative of a selected function of the intensity of at least one of said laser beams; said first means having, means for generating an oscillating signal having first and second amplitudes;

signal generating means for generating a gradually changing amplitude signal; and variable gain amplifying means having a gain control input for receiving said gradually changing signal, and a signal input for receiving said oscillating signal, said variable gain amplifying means capable of amplifying said oscillating signal in accordance with said gain control input signal and providing said first signal component; and said second means includes means for synchronously demodulating said first output signal as a function of said oscillating signal and providing said second signal component.

* * * * *